April 13, 1926.
J. W. McCAUSLAND ET AL
1,580,146
BUMPER
Filed Dec. 18, 1925
2 Sheets-Sheet 1
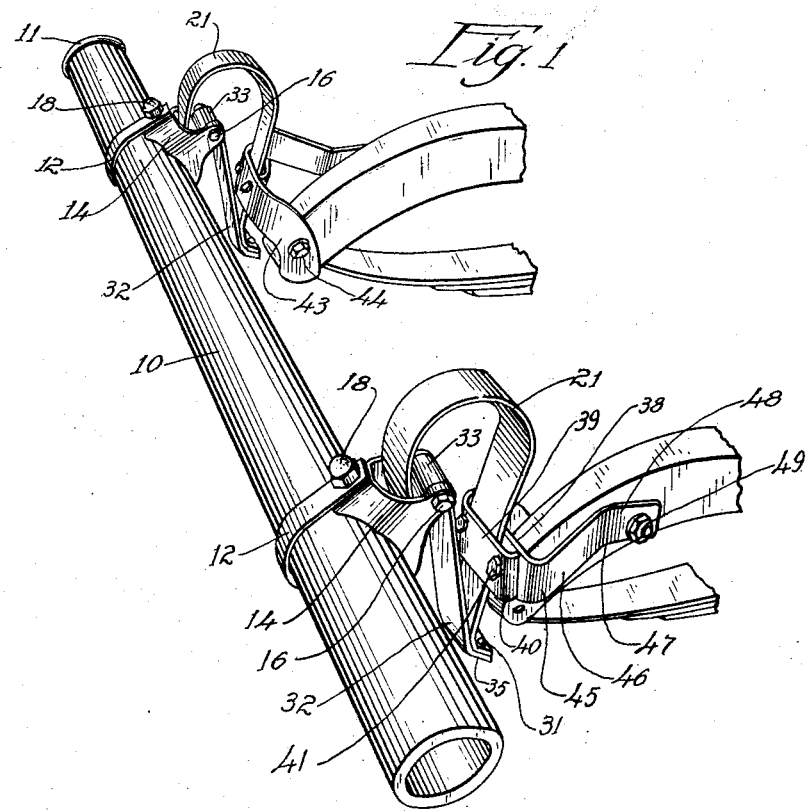
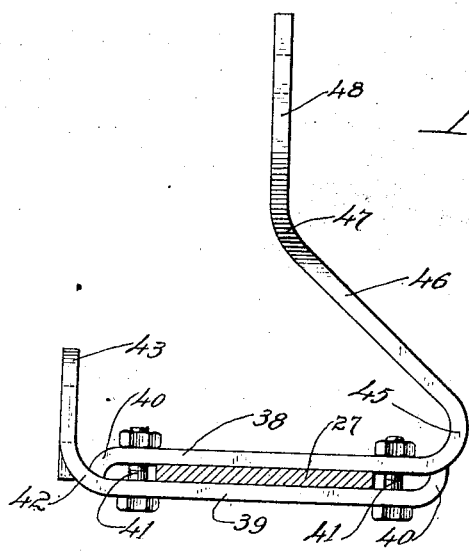
Inventors
JOHN W. McCAUSLAND
AND LEWIS F. STAFFORD.
By:
E. K. Lundy
ATTY April 13, 1926.
J. W. McCAUSLAND ET AL
1,580,146
BUMPER
Filed Dec. 18, 1925
2 Sheets-Sheet 2
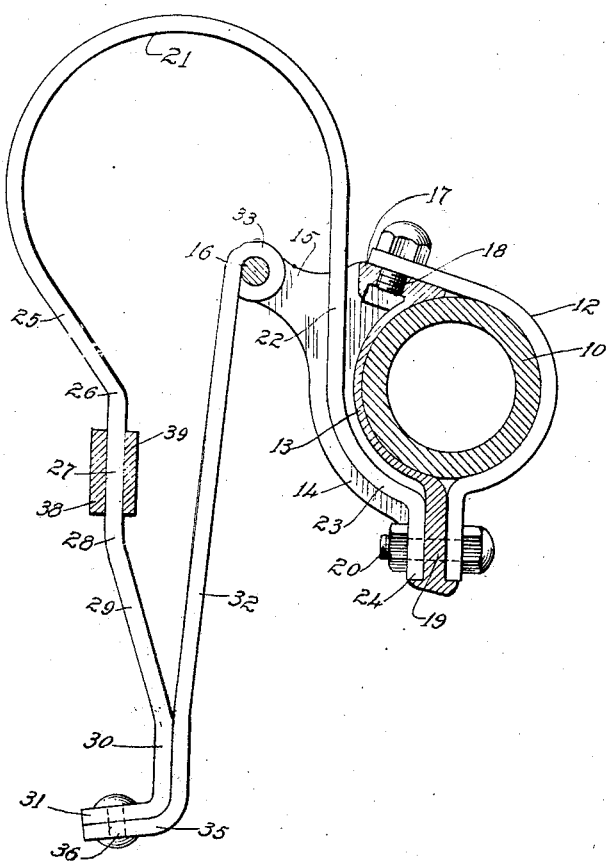
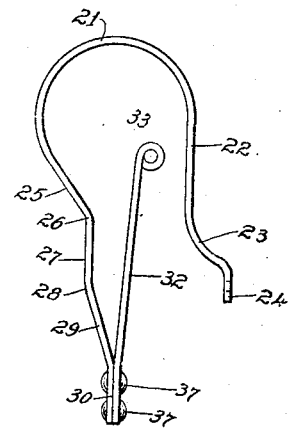
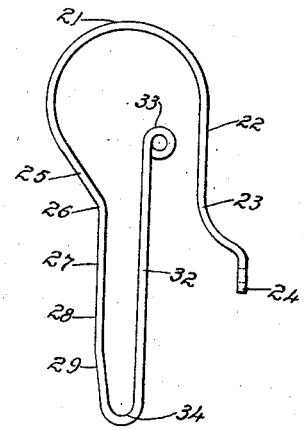
Inventors:
JOHN W. McCAUSLAND
AND LEWIS F. STAFFORD
By: E. N. Lundy
Att'y Patented Apr. 13, 1926.

1,580,146

UNITED STATES PATENT OFFICE.

JOHN W. McCAUSLAND AND LEWIS F. STAFFORD, OF CHICAGO, ILLINOIS.

BUMPER.

Application filed December 18, 1925. Serial No. 76,177.

*To all whom it may concern:*

Be it known that we, JOHN W. McCAUSLAND and LEWIS F. STAFFORD, both citizens of the United States, residing at Chicago, Cook County, Illinois, have invented a certain new and useful Improvement in Bumpers, of which the following is a full, clear, and exact description, such as will enable others skilled in the art to make and use the same.

Our present invention relates to automobile bumpers, in the form of a structure mounted upon the vehicle frame and having yieldability so as to absorb the shocks incident to striking another object. The present structure as a yieldingly mounted impact-receiving element that extends transversely across the end of the vehicle to protect the parts of the vehicle in collisions and which acts as a buffer against another vehicle striking the same.

The particular objects of this invention reside in providing a bumper that is capable of considerable spring action without becoming distorted. It is also an object of our invention to provide a bumper that has a suitable impact receiving bar, that may be rigid or yielding, and there are provided specially constructed springs for connecting the impact member to the frame of the vehicle. In this connection we have disclosed a rigid buffer member that is of tubular or cylindrical form and has suitable holders secured to it in which the ends of the spring members are mounted and these members comprise flat strips of metal bent so as to provide a maximum yielding without distortion, while at the same time dependably absorbing the shock of the impact.

We prefer to carry out our invention and to accomplish the divers objects thereof in substantially the manner hereinafter fully described and as more particularly pointed out in the claims, reference being here made to the accompanying drawings that form a part hereof.

In the drawings:—

Figure 1 is a perspective of our improved bumper and illustrating the same attached to the front end of a vehicle.

Figure 2 is a vertical edge elevation of one of the springs and showing a holder and the buffer member in transverse section.

Figure 3 is a top plan of one of the brackets for attaching the springs to the vehicle.

Figure 4 is a vertical edge elevation of a slightly modified spring member, and drawn to a reduced scale.

Figure 5 is a view, similar to Figure 4, of another modified spring member.

In the embodiment shown in the drawings, the buffer or impact-receiving member is an elongated tube 10 of suitable dimensions for the service required, which tube is closed at its ends by ornamental caps 11 and is of such length as to extend transversely in front of the end of the vehicle substantially from the outside edge of one fender to the corresponding edge of the opposite fender of the vehicle. Any other form of bumper member may be used and the ends might be deflected inwardly toward the vehicle to receive impacts oblique to the length of the vehicle. Intermediate its ends the tube has suitable holders secured to it by means of curved or U-shaped straps 12 that engage the tube as in Figures 1 and 2 and are securely clamped thereon. The holders are preferably castings or stampings each having a concave front wall 13 that provides a seat to receive the buffer member and, at its edges, a lateral or side wall 14. Ears or lugs 15 project from the upper portion of the side walls and preferably are apertured to receive a transverse pin or bolt 16 so that a link structure is provided for the purpose of pivotally connecting one end of the spring member to the holder as hereinafter described. At the upper portion of each holder the side walls 14 are connected by a web 17 that is bored to receive a bolt 18 that passes through the same as well as the adjacent end of the strap to assist in securing the tube in position in its seat in each holder. The lower edge of the concave wall extends downwardly in the form of a depending web 19 that is in a substantially vertical plane as will be seen in Fig. 2, and the said web is bored to receive a bolt or rivet 20 that secures the opposite end of the strap 12 in position upon the holder and thus clamps the tube 10 rigidly to the holder.

The spring members that are employed to provide a yieldable connection between the buffer member and the vehicle and which provide the necessary cushion that is utilized to absorb the impact that may be received by the buffer member, are each constructed preferably from yieldable flat strips of metal. Each spring member comprises a strip that is bent intermediate its ends into a loop or reverse bend of substantially C-shape and designated as 21 in the drawings. The spring member is positioned so that this reverse bend extends upwardly and outwardly from the main or attaching portion and then downwardly with respect to the vehicle, and extending down from the outer portion of this bend 21 there is a substantially straight portion 22 that is spaced from the main portion and passes into the holder between the side walls 14 and preferably spaced from the walls 13 and 17 of the holder. The lower end of this forward portion of each spring member below the C-shaped bend is curved downwardly and outwardly as at 23, substantially parallel to the wall 13 of the holder and is then bent to provide an ear 24 that is apertured to receive the bolt or rivet 20 that secures the strap 12 to the holder so that the said parts may be assembled in their respective relation by a single retaining element. The inner or main attaching portion of the spring member which is nearest the vehicle is inclined downwardly below the C-shaped bend through an oblique portion 25 and then at the point 26 is bent to provide a straight portion 27 that is in a substantially vertical plane and is at the location where the brackets that clamp the springs connect the bumper to the vehicle. This portion 27, as shown in the drawings, is below the horizontal plane of the axis of the buffer member 10. Below the straight vertical portion 27 the spring member is given another bend at the point 28 which provides another oblique downwardly extending portion 29 which at its lower end is provided with an L-shaped extension, one of the members 30 of which is substantially vertical and the other member 31 of which extends rearwardly towards the vehicle.

The spring structure is also provided with an upright spring arm or link 32 which is connected at its upper end to the bumper holder, preferably by providing an eye 33 at the upper end of the link which pivots on the pin 16 and thereby provides a pivotal or hinged connection between this link or arm of the spring and the holder. This substantially upright link or arm 32 may be formed either as a separate piece of the metal strip as illustrated in Figures 2 and 4 or it may be an integral extension of the main spring member as shown in Figure 5, in which latter event the spring member is given a reverse bend 34 opposite the large bend 21 and at the lower end of the rear portion of the spring. When the spring member is made in two parts the lower end of the arm 32 preferably lies flat against the portion 30 and has a lateral extension 35 that fits against the part 31 and preferably in contact therewith and is secured thereto by a bolt or rivet 36. The last described structure may be modified as illustrated in Figure 4 by joining adjacent portions of the two members by means of two rivets 37 and omitting the lateral rearwardly bent end portions or by operatively connecting them in any other manner. A unitary spring such as shown in Fig. 5 might have the sides of the return bend 34 compressed and riveted together to form a structure similar to those shown in Figs. 2 or 4.

The brackets that connect the springs to the vehicle may consist of oppositely arranged horizontal strips 38 and 39, that overlap and have their adjacent ends curved abruptly towards each other as at 40, so that the horizontal portions are spaced apart a slight distance to receive the portion 27 of the spring which is clamped securely therebetween by means of the bolts 41. The outer strip extends towards the rear as at 42 and is then given an edge-bend 43 downwardly so that its end portion will be positioned adjacent the end of the chassis horn to which it is shown as connected by the spring bolt or shackle-bolt 44. The inner member of the bracket beyond its straight overlapped front portion is given a reverse bend 45 to provide an obliquely disposed stretch 46 and is then deflected slightly as at 47 so that its inner portion 48 will lie alongside the horn of the chassis back of the end thereof and may be secured thereto by a suitable bolt 49.

Under the shock of collision impact against the bumper member, the buffer will tend to swing downwardly and backwardly about the pivots 16, thus pulling downwardly and inwardly upon the end 24 of the main spring member and also tending to compress or close the large loop 21 of said member. If the member 32 be of spring material, there will also be a backward deflection of that member, the upright extension or arm 32 will have moved backwards closer to the mounting brackets, and the holders and buffer member, while moving inward with the compressed parts of the spring, will also have had a rotative movement in a downward direction about pivot 16 which movement will have slightly straightened the curved portion 23 of the spring within the holder and will have drawn the C-shaped bend 21 downwardly to some extent.

In the preferred construction the main spring throughout its length and the link member 32 also are made of spring material throughout and the design and relative proportions are such that under heavy impacts there will be a building up of the resistance, the main spring loop being compressed until the holders or bumper bar engages the link 32 and thereafter the loop and the link are compressed affording an increasing resistance until said link "bottoms" against the attaching brackets on the chassis. If desired said attaching brackets may also be of spring material.

The relative spring qualities of the members may be varied, for example by having the links of stiffer material than the loops, and the pivotal or other connection between the loop and the bumper holders may be varied to change the arc within which the bumper will swing under impact.

In case of impacts against the bumper bar not perpendicular to its length the spring supports will also yield or twist laterally. Thus we have provided a bumper support which will yield to and absorb blows from whatever direction received.

What we claim is:—

1. A bumper comprising an impact-receiving member, holders secured to said member, brackets connecting the bumper to the vehicle, and spring structures secured to and projecting outwardly from said brackets, one end of each spring structure being secured to a holder and the opposite end of each spring structure having hinged connection with its respective holder.

2. A bumper comprising an impact-receiving member, and means for yieldably connecting said member to the vehicle including a pair of vertically disposed spring structures having both rigid and pivotal connection with said impact-receiving member.

3. A bumper comprising an impact-receiving member, and means for yieldably connecting said member to the vehicle including a pair of vertically disposed spring structures the ends of each of which are extended towards each other and each spring structure connected both rigidly and pivotally with said impact-receiving member.

4. A bumper comprising an impact-receiving member, and spring structures interposed between said member and the vehicle, said spring structures each extending at one end away from the vehicle in a substantially open bend and having rigid connection with the impact-receiving member, and the other end of each spring structure extended into said open bend and having pivotal connection with said impact-receiving member.

5. In means for connecting a bumper to a vehicle, a spring structure consisting of a vertically disposed member bent outwardly and downwardly at its upper end and having its opposite end extended upwardly into said bend whereby the ends overlap in spaced relation to each other and to the main portion of the vertical member, and devices for connecting the overlapped ends to a bumper.

6. A bumper comprising brackets, spaced spring structures mounted intermediate their ends upon said brackets, said spring structures each being extended upwardly from the brackets and then curved downwardly and also extended downwardly from the brackets and then upwardly, the ends of each spring structure overlapping each other, an impact member, and means independently connecting each of the overlapped ends of the spring structures to said impact member.

7. A bumper comprising an impact-receiving member, vertically positioned spring structures secured to the vehicle, and holders mounted upon the impact-receiving member and having pivotal connection with an end of each spring structure, and yieldable means connecting said holders to the vehicle.

8. In a bumper comprising an impact-receiving member, a vertically extending spring structure, means for anchoring an intermediate portion of the spring structure to a vehicle, the upper portion of the spring structure being looped downwardly with its end attached to the impact-receiving member, and an upward extension of the lower portion of the spring structure being pivotally connected at its end to the impact-receiving member.

9. In a bumper comprising an impact-receiving member, a vertically positioned looped spring structure having its return bent ends overlapped, the downwardly extending end being secured to a lower portion of the impact-receiving member, and the upwardly extending end being secured to an upper portion of the impact-receiving member.

10. In a bumper comprising an impact-receiving member, a vertically positioned looped spring structure having its return bent ends overlapped and attached to upper and lower portions respectively of the impact-receiving member, one of the attachments being pivotal.

11. In a bumper comprising an impact-receiving member, a vertically positioned spring structure having return bent ends which are overlapped, the downwardly extending end being fixedly secured to a lower portion of the impact-receiving member, and the upwardly extending end pivotally connected to an upper portion of the impact receiving member.

12. In a bumper comprising an impact-receiving member, a vertically positioned spring structure having two separate upwardly extending portions, one of which is looped back downwardly and fixed to the impact-receiving member, the other spring member being pivotally connected at its upper end to the impact-receiving member, and means for anchoring the spring structure to a vehicle.

13. In a bumper comprising an impact-receiving member, a vertically positioned spring structure having two separate upwardly extending portions, one of which is looped back downwardly and fixed to the lower portion of the impact-receiving member, the other spring portion being pivotally connected at its upper end to an upper portion of the impact-receiving member, and means for anchoring the spring to a vehicle.

14. A bumper comprising an elongated impact-receiving member for extension transversely of the end of a vehicle, a spring arm having a horizontal pivot for hingedly connecting the member with the vehicle, and yieldable means for resisting movement of the impact-receiving member.

15. A bumper comprising an elongated impact-receiving member for extension transversely of the end of a vehicle, yieldable means including a horizontal pivot for hingedly connecting the member with the vehicle, and other yieldable means for resisting movement of the impact receiving member.

16. A bumper comprising an impact-receiving member, a vertically positioned spring, means for anchoring one end of the spring to a vehicle, a pivotal connection between the other end of the spring and the impact-receiving member, and a second looped spring member fixed at its ends to the anchoring means and the impact-receiving member, respectively.

17. A bumper comprising an impact-receiving member, a looped spring having one end anchored to a vehicle and the other end attached to the impact-receiving member, and other means for pivotally connecting the impact-receiving member to the vehicle.

18. Means for mounting a bumper on a vehicle comprising a pair of spring arms arranged the one in front of the other and secured together at one end, the other ends being spaced apart and secured to the bumper and means for intermediately securing one of the spring arms to the vehicle.

19. Means for mounting a bumper on a vehicle comprising a pair of vertically positioned spring arms having their lower ends extending in the same direction and secured together and their upper ends spaced apart and secured to the bumper and means for connecting one of said spring arms to the vehicle.

20. Means for mounting a bumper on a vehicle comprising a spring and means for anchoring the spring on the vehicle, said spring extending both upwardly and downwardly from the anchoring means, the upwardly extending portion being looped outwardly and downwardly for connection with the bumper, and an arm extending upwardly from the downwardly extending portion of the spring with its upper end extended into the loop for connection with the bumper.

21. A bumper comprising an impact-receiving member, and means for yieldably connecting said member to the vehicle and including a pair of springs having both rigid and pivotal connection with said impact-receiving member.

22. Means for attaching a bumper to a vehicle comprising a spring loop adapted to be connected at one end to the vehicle and at the other end to the bumper, a link adapted to be connected at one end to the vehicle and extending within said loop, and a second link connecting the outer end of said spring loop with the end of the first named link within said loop.

23. Means for attaching a bumper to a vehicle comprising a spring loop adapted to be connected at one end to the vehicle and at the other end to the bumper, a link adapted to be connected at one end to the vehicle and extending within said loop, and a holder for the bumper, which connects the outer end of said spring with the end of said link within the loop.

24. Means for attaching a bumper to a vehicle comprising a spring loop adapted to be connected at one end to the vehicle and at the other end to the bumper, a link adapted to be connected at one end to the vehicle and extending within said loop, and a holder for the bumper attached to the outer end of the spring loop, and pivoted to the end of the link within the loop.

25. Means for attaching a bumper to a vehicle comprising a spring loop adapted to be connected at one end to the vehicle and at the other end to the bumper, a flexible link adapted to be connected at one end to the vehicle and extending within the loop, and a holder for the bumper attached to the outer end of the spring loop, the holder being pivoted to the end of the link within the spring loop.

26. Means for attaching a bumper to a vehicle comprising a spring loop adapted to be connected at one end to the vehicle and at the other end to the bumper, a flexible link adapted to be connected at one end to the vehicle and extending within the loop, and a holder for the bumper attached to the outer end of the spring loop, the holder having an arm projecting within the spring loop and pivotally connected to the end of the link.

27. Means for attaching a bumper to a vehicle comprising a spring having an intermediate looped portion and similarly directed ends, the inner end being connected to the vehicle and the outer end to the bumper, and other means for connecting the outer end of the spring with the vehicle, whereby movement of the bumper toward the vehicle will draw the looped portion of the spring toward the end connected to the vehicle.

28. Means for attaching a bumper to a vehicle comprising a spring having an intermediate looped portion and similarly directed ends, the inner end being connected to the vehicle and the outer end to the bumper, and means positioned within the spring loop and connecting the outer end of the spring with the vehicle, whereby movement of the bumper toward the vehicle will draw the looped portion of the spring toward the end connected to the vehicle.

29. Means for mounting a bumper on a vehicle comprising a spring structure and means connected to the spring structure for anchoring the same on the vehicle, said spring structure having an upwardly extended looped portion and a portion extending below the anchoring means and having pivotal connection with the bumper.

Signed at Chicago, in the county of Cook, and State of Illinois, this 9th day of December, 1925.

JOHN W. McCAUSLAND.
LEWIS F. STAFFORD.